UNITED STATES PATENT OFFICE.

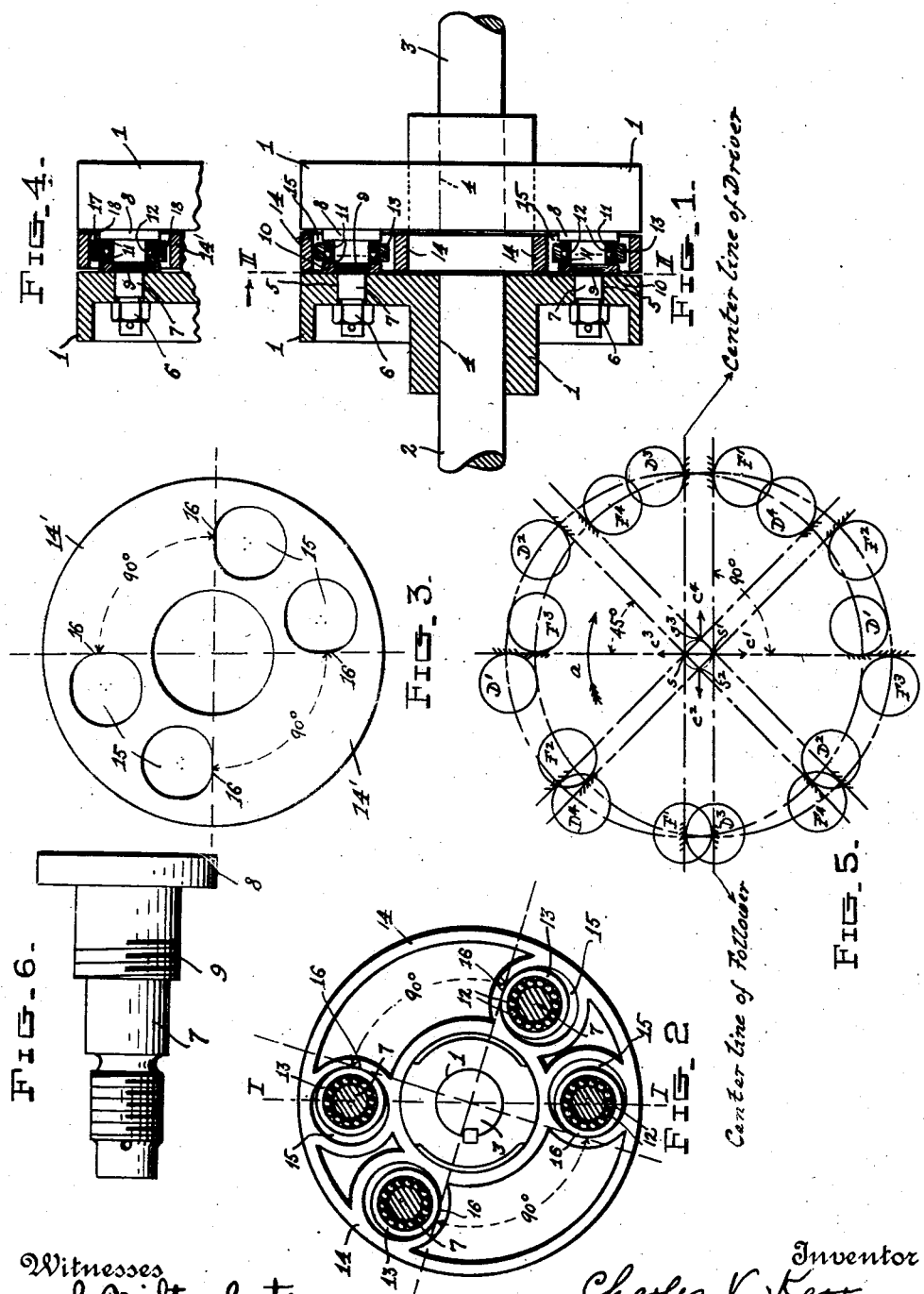

CHARLES VOLNEY KERR, OF EAST ORANGE, NEW JERSEY.

FLEXIBLE COUPLING.

1,159,777.      Specification of Letters Patent.      Patented Nov. 9, 1915.

Application filed December 23, 1913. Serial No. 808,369.

*To all whom it may concern:*

Be it known that I, CHARLES VOLNEY KERR, a citizen of the United States, residing at East Orange, in the county of Essex and State of New Jersey, have invented certain new and useful Improvements in Flexible Couplings, of which the following is a specification.

My invention relates to a flexible coupling for shafts which is particularly adapted for high speed work and the objects of the invention are, first, to construct and arrange the parts of the coupling so that, owing to any changes or inaccuracies of alinement, or variations of temperature in one or both machines connected by the coupling, the proper operation of the shafting will not be altered or destroyed; second, to construct and arrange the parts so as to form a coupling having a smooth exterior surface, thereby preventing any possibility of an operator being caught by and drawn into the rapidly moving coupling; third, to so construct and arrange the elements of the coupling that there are provided two pairs of contact points arranged at right angles to each other, which permit movement in the direction of one pair without parting contact at the other pair; fourth, to arrange the parts of the coupling so that the driving is done by a couple, thereby preventing any pressure between the bearings; fifth, to provide a flexible coupling which is not only adapted to be used with a steel floating ring or rings, but also a ring or rings made of hard fiber, which enables the coupling to operate the connected shafts out of line, as well as offset, and at the same time adapt it for use as an insulating coupling for electric generators or motors; sixth, to construct and arrange a coupling so that when the same is rapidly rotated the centrifugal force of the connecting and floating ring or disk is always in such a direction as to hold the said ring or disk in contact with the bearing points or pins of the coupling; seventh, to construct and arrange a flexible coupling in which ball bearings are provided for the purpose of giving the floating ring perfect freedom of movement, and enable the same to assume at all times the proper position for efficient transmission of power during the entire rotation of the coupling; eighth, to construct a flexible coupling in which ball bearings transmit the load or torque from one shaft section to another section, and at the same time permit one shaft section to freely move endwise without putting a thrust on the other shaft section, and also avoid the sliding or rubbing of the pins on the surface of the floating ring or fiber disks; ninth, to construct a flexible coupling which will have all the functions above indicated and at the same time will comprise parts that may be easily assembled or taken apart, readily inspected, and will require the minimum amount of repairs.

The invention consists of structural features and relative arrangements of elements which will be hereinafter more fully described and particularly pointed out in the appended claim.

Referring to the drawings, in which similar reference characters indicate the same parts in the several figures of drawing, Figure 1 is a longitudinal central section on line I—I of Fig. 2, one of the flanges being shown in side elevation, when a steel floating ring is employed; Fig. 2 is a section on line II—II of Fig. 1; Fig. 3 is an end view of the floating ring or rings, when fiber is used; Fig. 4 is a fragmentary section, similar to that of Fig. 1, when a fiber floating ring is employed; Fig. 5 is a displacement diagram indicating the different positions of the driving and driven parts of the coupling through its phases of rotary movement; and Fig. 6 is a detached and enlarged side view of one of the driving pins.

Referring to the drawings, the coupling as shown in Fig. 1 consists of two rotatable members or flanges 1, 1, of cast iron or other suitable material made exactly alike and whose central web may be solid or provided with four radial spokes, for lightness, if so desired. Shaft sections 2 and 3 are attached to the central openings 4 of the flanges 1, 1. Each of the members or flanges 1, 1, is provided with two holes 5, 5, diametrically opposite to each other and the same distance from the axis or center of the flange. Passing into said holes 5, 5, and securely held therein by bolts 6, engaging their threaded ends, are driving pins 7 (see Fig. 6), said driving pins being also arranged at equal distances from the center and on a diameter of the flange and provided with an integral enlarged circular end 8, and an intermediate threaded section 9, which is engaged by an internally threaded collar 10. Interposed between the outer end 8 and fixed collar 10 of the driving pins 7, is provided a cup or collar 11 on each side of a series of balls 12, 12, and surrounding said collars 11, 11, and balls 12, 12, is an outer ball race 13 which is prevented from slipping off the pins 7 by means of the end 8 and collar 10.

Between the inner surfaces of the two rotary members or flanges 1, 1, and engaged by the outer ball races 13, carried by the ball bearings 12, 12 on the driving pins 7, 7, are placed one or more floating rings or disks 14, having openings 15, 15, so arranged that the bearing surfaces or faces 16, 16, in the ring for the two pairs of pins 7, 7, are on diameters of the ring at right angles to each other, and with the contact or bearing surfaces or faces 16, 16, radially disposed to receive the pressure of the outer ball races 13 on the driving pins 7, 7, as shown clearly in Fig. 2. Said floating rings or disks 14 are made, as shown in Fig. 2, of steel or other metal, but may be made of other material such as fiber 14', as shown in Fig. 3, said fiber having a specific gravity of about one-fifth that of cast iron, with equal tensile strength, and a bearing strength equal to soft steel; it is also not affected by acid or oil and acts as an insulator when the invention is used in coupling an electric generator or motor with some other apparatus. When the floating ring 14' of fiber is used, a modified form of outer ball race 17 is employed, having an internal flange 18, which passes between the cups or collars 11, and rests on the balls 12, 12, as shown in Fig. 4.

The operation of the invention is as follows: Assuming the center lines of the driving shaft and the driven shaft are separated or displaced a distance equal to line $s, s'$, indicated in the diagram shown in Fig. 5, the first position of the driving pins when rotated in the direction indicated by the arrow $a$ will be $D', D'$, and that of the driven or follower pins will be $F', F'$, and the center of the floating ring or disk is at $S'$ with the diameters connecting the outer bearing faces of the ball bearings on the driving and driven pins at right angles. If the driving pins move through forty-five degrees to the position indicated by $D^2, D^2$, the driven pins are in the position indicated by $F^2, F^2$, and the center of the floating disk or ring moves through ninety degrees to $S^2$, and if the pair of driving pins is turned through ninety degrees to the position indicated by $D^3, D^3$, the driven pins are at $F^3, F^3$, and the center of the floating ring or disk has moved from $S^2$ to $S$ or one-hundred and eighty degrees or one-half a revolution. When the driving pins are at $D^4, D^4$, the driven or follower pins are at $F^4, F^4$, and the center of the floating ring or disk is at $S^3$, and upon further rotation, and through an angle of one hundred and eighty degrees, of the driving pins, they will come into the position indicated by $D', D'$, with the driving pin which was at the bottom of the coupling at the top, and vice versa, and the center of the floating disk or ring will be again at $S'$, said center having made a complete rotation or through three hundred and sixty degrees of a circle, whose diameter is the line $s, s'$, and equal to the distance which the centers of the shafts are displaced or out of line.

Thus it will be seen from the foregoing description and operation of the invention, and as fully shown in the displacement diagram of Fig. 5, the rotation of the center of the floating disk or ring about a circle whose diameter is the shaft displacement is twice the rotation of the flanges or rotatable members and the connected shaft sections, and this rotation sets up a radial centrifugal force, as indicated by the arrows $c', c^2$, and $c^3$ and $c^4$, which tends always to slide the floating disks or rings into position and hold them there, to be properly and efficiently engaged by the driving and driven pins of the rotatable members.

It will be seen from the herein described structural characteristics and relative arrangements of the elements comprising my invention, that I have devised a flexible coupling in which all the advantages and objects of the invention set forth in the introductory statement of invention are fully and efficiently carried out, and the coupling is readily adaptable when the shaft sections are not parallel, and permits free endwise movement of the rotating parts of driven or driving machines, and at the same time no side thrust is put on the bearings of the shaft sections, a most important feature and advantage over prior couplings of this character. Furthermore, the herein described coupling is well adapted for transmitting power between shafts which are greatly out of line, or connecting a series of lengths of line shafting, where settling of floors or other supports for shaft bearings would throw said shaft sections badly out of line and cause a great loss of power.

What I claim is:—

A flexible coupling for shafts comprising two separated rotatable members or flanges, a pair of pins projecting from each of said members and parallel with the axis of rotation thereof, said pins being arranged diametrically opposite each other, a ball bearing surrounding and supported by each of said pins, and a floating ring or disk loosely interposed between said separated rotatable members or flanges and provided with holes arranged diametrically opposite to each other, each of said holes having a radial bearing face at right angles to the bearing face of the adjacent hole and engaged by a ball bearing on the pin projecting from one of the rotatable members and into said hole.

In testimony whereof I affix my signature in presence of two witnesses.

CHARLES VOLNEY KERR

Witnesses:
  EDWIN M. CORYELL,
  JOHN J. O'CONNELL.